United States Patent [19]
Volpp et al.

[11] 3,874,873
[45] Apr. 1, 1975

[54] HERBICIDAL COMPOSITIONS BASED ON 1,2,3-THIADIAZOL-5-YL UREAS

[75] Inventors: Gert Paul Volpp, Princeton; Harry Dounchis, Lawrence, both of N.J.

[73] Assignee: FMC Corporation, New York, N.Y.

[22] Filed: May 7, 1973

[21] Appl. No.: 357,611

Related U.S. Application Data

[60] Division of Ser. No. 238,664, March 27, 1972, Pat. No. 3,787,434, which is a continuation-in-part of Ser. No. 156,125, June 23, 1971, abandoned.

[52] U.S. Cl. ........................................ 71/90, 71/88
[51] Int. Cl. .................................................. A01n 9/12
[58] Field of Search ................................ 71/90, 88

[56] References Cited
UNITED STATES PATENTS

| | | | |
|---|---|---|---|
| 3,520,929 | 7/1970 | Maravetz et al. | 71/90 |
| 3,551,442 | 12/1970 | Guillot et al. | 71/90 |
| 3,726,892 | 4/1973 | Cebalo | 71/90 |
| 3,734,923 | 5/1973 | Dowding et al. | 71/90 |

*Primary Examiner*—Glennon H. Hollrah

[57] ABSTRACT

A new class of herbicidal compounds of the formula:

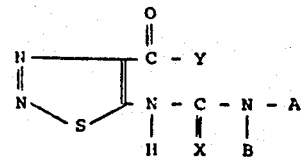

where A is lower alkyl or alkenyl radical, B is —H or —$CH_3$, X is oxygen or sulfur, and Y is an alcohol or amine residue, and the metallic and amine salts thereof, has selective pre-emergence and post-emergence herbicidal activity. The synthesis of members of this class is described in detail, and the utility of representative compounds is exemplified.

4 Claims, No Drawings

HERBICIDAL COMPOSITIONS BASED ON 1,2,3-THIADIAZOL-5-YL UREAS

CROSS REFERENCE TO RELATED APPLICATIONS

This is a division of application Ser. No. 238,664, filed Mar. 27, 1972, now U.S. Pat. No. 3,787,434, which application is a continuation-in-part of application Ser. No. 156,125, filed June 23, 1971, now abandoned.

This invention pertains to the general field of herbicides, and particularly to compositions which selectively control plant growth.

There is a substantial need for herbicides with selectively in both pre- and post-emergence applications. It is known that certain substituted 1,2,4- and 1,3,4-thiadiazoles and urea derivatives thereof exhibit herbicidal activity of varying types. However, the outstanding plant responses in selective pre-emergence and post-emergence herbicidal activity of the compounds of the present invention have not previously been reported or suggested in the art.

This invention pertains to novel herbicidal compounds, to new herbicidal compositions, and to new methods for the selective control of undesired plant growth. Particularly useful control of undesired plant growth is obtained in the presence of such crops as corn and peanuts. Said compositions may be applied and utilized by commonly accepted methods.

The new herbicidal compositions of this invention are of the formula:

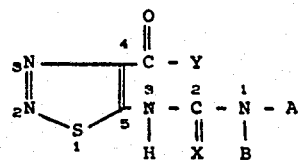

where A is lower alkyl or alkenyl radical of up to four carbon atoms; B is —H or —CH$_3$, with the proviso that B is —H when A is other than —CH$_3$; X is oxygen or sulfur; Y is —OR, —NHR, —NRR', —NB-NH$_2$, or

in which R and R' are alkyl, alkenyl, alkynyl or cycloalkyl groups containing up to 12 carbon atoms which may contain an ether linkage or a hydroxy substituent, and in which R and R' may be the same or different; Z is —O—, —CH$_2$— or absent. Metallic and amine salts of these novel compounds show similar herbicidal activity; agriculturally acceptable metallic cations, such as sodium, potassium, ammonium, calcium and zinc, may be employed.

Procedures by which the compounds of this invention may be prepared are exemplified by one or more of the following:

a. aminolysis of phenyl (thiadiazol-5-yl)carbamates:

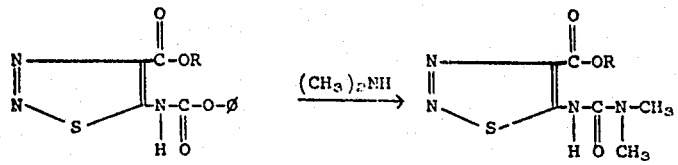

b. aminolysis of 1-substituted-3-(4-alkoxycarbonyl-1,2,3-thiadiazol-5-yl)ureas:

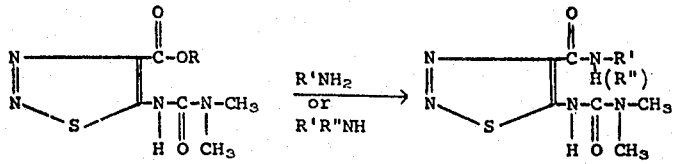

c. ester exchange of 1-substituted-3-(4-alkoxycarbonyl-1,2,3-thiadiazol-5-yl)ureas:

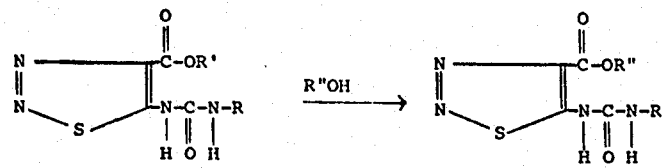

d. via 5-(3-substituted ureido)-1,2,3-thiadiazol-4-carbonyl chloride:

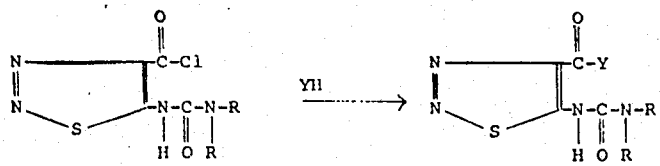

Thioureas may be prepared from the corresponding ureas by reaction with phosphorus pentasulfide. Salts may be prepared by reaction of the urea with an appropriate base.

The phenyl (4-alkoxycarbonyl-1,2,3-thiadiazol-5-yl)-carbamates necessary for the preparation of the compounds of this invention according to method (a) above have been prepared according to the general procedure of Goerdeler and Gnad [Chem. Ber. 99, 1618 (1966)]. Using that method, 78.25 g of phenyl chloroformate was added to a suspension of 48.5 g of potassium thiocyanate in 100 ml of acetonitrile containing 57.0 g of ethyl diazoacetate. The mixture was stirred for 25 hours, then poured into 500 ml of water. The red solid was collected, washed with ethanol and recrystallized, with charcoal treatment, from ethanol to give 37 g (26 percent) of yellow crystalline solid. A second recrystallization, with charcoal treatment, from ethanol gave 26 g (18 percent) of phenyl (4-ethoxycarbonyl-1,2,3-thiadiazol-5-yl)carbamate, white leaflets, mp 154°–155° (Goerdeler and Gnad report mp 156°C).

Using the appropriate diazoacetates, phenyl (4-propoxycarbonyl-1,2,3-thiadiazol-5-yl) carbamate (mp = 138°–139.5°C) and phenyl (4-butoxycarbonyl-1,2,3-thiadiazol-5-yl)carbamate (mp = 127.5°–128°C) were similarly prepared, in yields of 28 and 8 percent respectively.

The preparation of representative members of this class of herbicidal compounds is illustrated below. All temperatures are expressed in degrees centigrade. All parts and percentages are by weight.

EXAMPLE 1

Preparation of 1,1-Dimethyl-3-(4-ethoxycarbonyl-1,2,3-thiadiazol-5-yl)urea

Into a 250 ml flask equipped with condenser, stirrer and gas bubbler were placed 2 g of phenyl (4-ethoxycarbonyl-1,2,3-thiadiazol-5-yl) carbamate and 100 ml of chloroform. Dimethylamine gas was bubbled through the solution for a period of 10 minutes at room temperature, at which time the reaction was shown to be complete by thin-layer chromatographic analysis. The solvent was removed and the residue recrystallized from ethanol to give 1.1 g of 1,1-dimethyl-3-(4-ethoxycarbonyl-1,2,3-thiadiazol-5-yl)urea, mp = 156°–157°. Recrystallization again from ethanol increased the melting point to 159°–161°. The nmr spectrum was consistent with the assigned structure.

Analysis: Calc'd for $C_8H_{12}N_4O_3S$: C 39.34; H 4.95; N 22.94
Found: C 39.15; H 4.88; N 22.84.

EXAMPLE 2

Preparation of 1-Methyl-3-(4-ethoxycarbonyl-1,2,3-thiadiazol-5-yl)urea

By the procedure of Example 1, methylamine was bubbled through a mixture of 10 g of phenyl (4-ethoxycarbonyl-1,2,3-thiadiazol-5-yl) carbamate in chloroform for 20 minutes. After removal of the solvent, the product was recrystallized from ethanol (using charcoal) to give 3g of 1-methyl-3-(4-ethoxycarbonyl-1,2,3-thiadiazol-5-yl)urea; mp = 230°–231°.

An additional 1.8 g of product was obtained by the same reaction, using 5g of starting carbamate. The product was recrystallized several times to obtain product melting at 233.5°–234.5°. A mixture of these two samples was employed in the herbicidal studies.

Analysis: Calc'd for $C_7H_{10}N_4O_3S$: C 36.52; H 4.38; N 24.34
Found: C 36.57; H 4.50; N 24.23.

EXAMPLE 3

Preparation of 1,1-Dimethyl-3-(4-propoxycarbonyl-1,2,3-thiadiazol-5-yl)urea

By the procedure of Example 1, dimethylamine was reacted for 4 hours with 3.0 g of phenyl (4-propxycarbonyl-1,2,3-thiadiazol-5-yl)carbamate in 100 ml of chloroform, maintaining the temperature of the reaction mixture below 35°. The solvent was removed under reduced pressure and the residue was purified by chromatography on alumina to give 1.5 g of 1,1-dimethyl-3-(4-propoxycarbonyl-1,2,3-thiadiazol-5-yl)urea; mp = 119°–120°.

Analysis: Calc'd for $C_9H_{14}N_4O_3S$: C 41.86; H 5.46; N 21.70
Found: C 41.19; H 5.43; N 21.57.

Using an alternate synthetic procedure, another sample was prepared for use in herbicidal testing. A chip of sodium metal (catalytic amount) was added to 300 ml of n-propanol and to the solution was added 7.0 g of 1,1-dimethyl-3-(4-ethoxycarbonyl-1,2,3-thiadiazol-5-yl)urea. The reaction mixture was heated under reflux (97°) overnight. A thin-layer chromatographic analysis indicated the reaction was complete. The mixture was cooled to 0° and the solid collected by filtration to give 44.3 g of 1,1-dimethyl-3-(4-propoxycarbonyl-1,2,3-thiadiazol-5-yl)urea; mp = 120.5°–122°. The ir spectrum of this product was consistent with the assigned structure.

EXAMPLE 4 preparation of 1,1-Dimethyl-3-(4-butoxyearbonyl-1,2,3-thiadiazol-5-yl)urea

A solution of 4.40 g of phenyl (4-butoxycarbonyl-1,2,3-thiadiazol-5-yl)carbamate in 50 ml of chloroform was treated with 0.68 g of dimethylamine in 25 ml of chloroform and the mixture was kept at ambient temperature. After 24 hours, a slight excess of dimethylamine was passed through the mixture. The solvent was removed under reduced pressure and the residue was triturated with 5 percent of ether in petroleum ether to give 3.37 g of product. The product was recrystallized twice from petroleum ether to give 1.83 g of 1,1-dimethyl-3-(4-butoxycarbonyl-1,2,3-thiadiazol-5-yl)urea; mp = 80.8°–81.5°. The ir spectrum of the product was consistent with the assigned structure Analysis: Calc'd for $C_{10}H_{16}N_4O_3S$: C 44.11; H 5.92; N 20.58
Found: C 44.03; H 5.81; N 20.00.

EXAMPLE 5

Preparation of 1,1-Dimethyl-3-(4-isobutoxycarbonyl-1,2,3-thiadiazol-5-yl)urea

A solution of 4.0 g of 1,1-dimethyl-3-(4-ethoxycarbonyl-1,2,3-thiadiazol-5-yl)urea in 150 ml of isobutanol containing a catalytic amount of sodium isobutoxide was refluxed overnight, then allowed to stand at ambient temperature for 3 days, at which time a thin-layer chromatographic analysis indicated completion of the reaction. The solid was collected, dissolved in isopropanol and the solution filtered. The isopropanol was removed under reduced pressure and the residue triturated with hot water. The solid was dried overnight under reduced pressure to give 2.5 g of 1,1-dimethyl-3-(4-isobutoxycarbonyl-1,2,3-thiadiazol-5-yl)urea; mp = 119°–121°. The ir and nmr spectra were consistent with the assigned structure.

Analysis: Calc'd for $C_{10}H_{16}N_4O_3S$: C 44.11; H 5.92; N 20.58
Found: C 44.09; H 5.97; N 20.61.

EXAMPLE 6

Preparation of 1,1-Dimethyl-3-(4-isobutylcarbamoyl-1,2,3-thiadiazol-5-yl)urea

A mixture of 7.0 g of 1,1-dimethyl-3-(4-ethoxycarbonyl-1,2,3-thiadiazol-5-yl)urea and 100 ml of isobutylamine was refluxed for 3 hours. The mixture was set aside overnight at ambient temperature and was then concentrated under reduced pressure. The residue was stirred with 100 ml of 10 percent acetic acid, cooled by filtration, washed with water and vacuum-dried over phosphorus pentoxide. The product was recrystallized from heptane and vacuum-dried at 40° over phosphorus pentoxide to give 5.70 g of 1,1-dimethyl-3-(4-isobutylcarbamoyl- 1,2,3-thiadiazol-5-yl)urea; mp = 117°–118°. The ir and nmr spectra of the proeuct were consistent with the assigned structure.

Analysis: Calc'd for $C_{10}H_{17}N_5O_2S$: C 44.27; H 6.32; N 25.82
Found: C 44.94; H 6.62; N 25.29.

EXAMPLE 7 preparation of 1,1-Dimethyl-3-(4-decylcarbamoyl-1,2,3-thiadiazol-5-yl)urea

A mixture prepared from 7.0 g of 1,1-dimethyl-3-(4-ethoxycarbonyl-1,2,3-thiadiazol-5-yl)urea and 50 ml of n-decylamine (exothermic) was heated until a single phase resulted. The reaction mixture was then cooled and poured into 600 ml of petroleum ether. The insoluble product was collected by filtration and washed with petroleum ether. Additional product, obtained by concentration of the petroleum ether filtrate, was washed several times and combined with the first crop of product. The product was stirred for 20 minutes with 150 ml of 20 percent acetic acid, collected by filtration, washed and dried. The product was then recrystallized from heptane and vacuum-dried over phosphorus pentoxide to give 5.51 g of 1,1-dimethyl-3-(4-decylcarbamoyl-1,2,3-thiadiazol-5-yl) urea; mp=85°–86.3°. The ir and nmr spectra of the product were consistent with the assigned structure.

Analysis: Calc'd for $C_{16}H_{29}N_5O_2S$: C 54.06; H 8.22; N 19.71
Found: C 54.30; H 8.58; N 19.38.

EXAMPLE 8

Preparation of 1,1-Dimethyl-3-(4-isopropylcarbamoyl-1,2,3-thiadiazol-5-yl)urea

A mixture of 2.5 g of 1,1-dimethyl-3-(4-ethoxycarbonyl-1,2,3-thiadiazol-5-yl)urea and 150 ml of isopropylamine was stirred for ½ hour, but thin-layer chromatographic analysis indicated no reaction and the mixture was heated under reflux overnight. The mixture was cooled, volatile materials removed under reduced pressure and the residue was recrystallized twice from heptane to give 2.0 g of 1,1-dimethyl-3-(4-isopropylcarbamoyl-1,2,3-thiadiazol-5-yl)urea, mp = 153.5°–155.5°. The ir and nmr spectra of the product were consistent with the assigned structure. Recrystallization from isopropanol gave solid, mp = 153°–154°.

Analysis: Calc'd for $C_7H_{15}N_5O_2S$: C 42.02; H 5.88; N 27.23
Found: C 41.84; H 6.30; N 27.46.

EXAMPLE 9

Preparation of 1,1-Dimethyl-3-(4-butylcarbamoyl-1,2,3-thiadiazol-5-yl)urea

A solution of 5.0 g of 1,1-dimethyl-3-(4-ethoxycarbonyl-1,2,3-thiadiazol-5-yl)urea in 150 ml of butylamine was heated under reflux for 2.5 hours, then cooled and filtered. Removal of the volatile materials left a yellow oil which crystallized on trituration with ethyl ether. The solid was collected and recrystallized from octane to give solid, mp = 111°–120°. The ether wash was concentrated to give a solid, mp = 128°–140°. These two solids were separately recrystallized from cyclohexane to give solids, mp = 130°–131°. The combined yield of 1,1-dimethyl-3-(4-butylcarbamoyl-1,2,3-thiadiazol-5-yl)urea was 3.2 g. The ir and nmr spectra of the product were consistent with the assigned structure.

Analysis: Calc'd for $C_{10}H_{17}N_5O_2S$: C 44.27; H 6.32; N 25.82
Found: C 43.80; H 6.50; N 25.27.

EXAMPLE 10

Preparation of 1,1-Dimethyl-3-(4-sec-butylcarbamoyl-1,2,3-thiadiazol-5-yl)urea

A solution of 4.0 g of 1,1-dimethyl-3-(4-ethoxycarbonyl-1,2,3-thiadiazol-5-yl)urea in 50 ml of sec-butylamine was heated under reflux overnight. The volatile materials were removed under reduced pressure and the residual yellow oil triturated with ethyl ether and petroleum ether to give 3.9 g of solid, mp = 120.4°–123°. This crude product was washed with dilute hydrochloric acid, then recrystallized twice from heptane, then from butanol, to give 1.9 g of 1,1-dimethyl-3-(4-sec-butylcarbamoyl-1,2,3-thiadiazol-5-yl)urea, mp = 131°–132°. Recrystallization from ethanol increased the melting point to 132°–133°. The ir and nmr spectra of the product were consistent with the assigned structure.

Analysis: Calc'd for $C_{10}H_{17}N_5O_2S$: C 44.27; H 6.32; N 25.82
Found: C 44.54; H 6.58; N 26.09.

EXAMPLE 11

Preparation of 1,1-Dimethyl-3-(4-allylcarbamoyl-1,2,3-thiadiazol-5-yl)urea

A mixture of 7.0 g of 1,1-dimethyl-3-(4-ethoxycarbonyl-1,2,3-thiadiazol-5-yl(urea and 100 ml of allylamine was heated under reflux for 3 hours. After standing overnight, the mixture was concentrated under reduced pressure and the residue stirred with 100 ml of 10 percent acetic acid. The solid was collected on a filter and washed with water, then dried over phorphorus pentoxide to give 9.65 g of product. Recrystallization from absolute ethanol gave, after drying under reduced pressure over phosphorus pentoxide, 5.78 g of 1,1-dimethyl-3-(4-allylcarbamoyl-1,2,3-thiadiazol-5-yl)urea, mp 163°–165°. The ir and nmr spectra were consistent with the assigned structure.

Analysis: Calc'd for $C_9H_{13}N_5O_2S$: C 42.35; H 5.13; N 27.44
Found: C 42.55; H 5.53; N 26.91.

EXAMPLE 12

Preparation of 1,1-Dimethyl-3-(4-methallylcarbamoyl-1,2,3-thiadiazol-5-yl)urea

A mixture of 5.0 g of 1,1-dimethyl-3-(4-ethoxycarbonyl-1,2,3-thiadiazol-5-yl)urea and 15 g of methallylamine was heated for 5 hours. Decolorizing charcoal was added and the reaction mixture was filtered ;through a layer of diatomaceous earth, rinsing the filter with chloroform. The filtrate was concentrated under reduced pressure and the residue was washed with ether to give 5.5 g of solid, mp = 130°–135°. Recrystallization from acetonitrile gave 2.7 g of 1,1-dimethyl-3-(4-methallylcarbamoyl-1,2,3-thiadiazol-5-yl)urea, mp = 13°–137°. Recrystallization from benzene increased the melting point to 135°–137°.

Analysis: Calc'd for $C_{10}H_{15}N_5O_2S$: C 44.60; H 5.62; N 26.01
Found: C 44.45; H 5.34; N 26.18.

EXAMPLE 13

Preparation of 1,1-Dimethyl-3-]4-(dimethylcarbamoyl)-1,2,3-thiadiazol-5-yl]urea

During 4 hours, dimethylamine gas was bubbled through a solution of 1.0 g of phenyl (4-ethoxycarbonyl-1,2,3-thiadiazol-5-yl)carbamate in 8 ml of dimethylformamide. The reaction mixture was poured into ice water and allowed to stand overnight at room temperature. The mixture was extracted with three 150-ml volumes of methylene chloride; and the extracts were combined, washed with water and dried over magnesium sulfate. Solvent was removed under reduced pressure to give a yellow oil which upon trituration with ethanol, using a dry-ice bath, gave 0.3 g of solid product, mp=130°–140°. Two recrystallizations from ethanol gave purified 1,1-dimethyl-3-[4-(dimethylcarbamoyl)-1,2,3-thiadiazol-5-yl]urea; mp = 158°–159°. The ir and nmr spectra were consistent with the assigned structure.

Analysis: Calc'd for $C_8H_{13}N_5O_2S$: C 39.50; H 5.39; N 28.80
Found: C 39.62; H 5.33; N 28.39.

In the same manner, 10 g of phenyl (4-ethoxycarbonyl-1,2,3-thiadiazol-5-yl)carbamate in 65 ml of dimethylformamide was saturated with dimethylamine for five hours at steam-bath temperature. Isolation of the product as above gave, after recrystallization from ethanol, 2.3 g of 1,1-dimethyl-3-[4-(dimethylcarbamoyl)-1,2,3-thiadiazol-5-yl]urea, mp = 158.5°–159.5°. Mixture with the product previously obtained resulted in no depression of the melting point.

EXAMPLE 14

Preparation of 1,1-Dimethyl-3-(4-morpholinocarbonyl-1,2,3-thiadiazol-5-yl)urea

A mixture of 7.0 g of 1,1-dimethyl-3-(4-ethoxycarbonyl-1,2,3-thiadiazol-5-yl)urea and 2.1 g of morpholine in 100 ml of ethanol was heated under reflux for 20 hours. Thin-layer chromatographic analysis indicated no reaction, thus volatile materials were removed and 50 ml of morpholine was added to the residue. This mixture was heated on a steam bath for 2 hours, after which thin-layer chromatographic analysis indicated complete reaction. Unreacted morpholine was removed under reduced pressure and the residue washed with ether. The washed solid was recrystallized from ethanol to give, after drying over phosphorus pentoxide, 5.8 g of 1,1-dimethyl-3-(4-morpholinocarbonyl-1,2,3-thiadiazol-5-yl)urea; mp = 165°–166°. A second recrystallization increased the melting point to 166.3°–167°. The ir and nmr spectra were consistent with the assigned structure.

Analysis: Calc'd for $C_{10}H_{15}N_5O_3S$: C 42.10; H 5.30; N 24.55
Found: C 41.86; H 5.42; N 24.27.

EXAMPLE 15

Preparation of 1,1-Dimethyl-3-(4-carbazoyl-1,2,3-thiadiazol-5-yl) urea

To 50 ml of 85 percent hydrazin hydrate was added portionwise 7.0 g of 1,1-dimethyl-3-(4-ethoxycarbonyl-1,2,3-thiadiazol-5-yl)urea. The mixture was heated to about 50°, after which hydrazine hydrate was removed under reduced pressure. The product was recrystallized from aqueous alcohol (50 percent) and vacuum-dried over phosphorus pentoxide to give 3.66 g of 1,1-dimethyl-3-(4-carbazoyl-1,2,3-thiadiazol-5-yl)urea; mp=220.5°–222°. The ir and nmr spectra were consistent with the assigned structure.

Analysis: Calc'd for $C_6H_{10}N_6O_2S$: C 31.31; H 4.38; N 36.51
Found: C 31.35; H 4.36; N 35.35.

EXAMPLE 16

Preparation of 1-Methyl-3-(4-isopropylcarbamoyl-1,2,3-thiadiazol-5-yl)urea

A mixture of 5.0 g of 1-methyl-3-(4-ethoxycarbonyl-1,2,3-thiadiazol-5-yl)urea and 60 ml of isopropylamine was stirred at ambient temperature for 19 hours, after which thin-layer chromatographic analysis indicated that all starting urea had been consumed. The solid was isolated and the filtrate concentrated to give another solid. The two solids were independently washed with dilute hydrochloric acid and recrystallized from acetonitrile to give crystals which melted at 184°–187°. Infrared spectroscopic examination showed the two solids to be identical; thus they were combined to give 2.9 g of 1-methyl-3-(4-isopropylcarbamoyl-1,2,3-thiadiazol-5-yl)urea. The nmr spectrum was consistent with the assigned structure.

Analysis: Calc'd for C$_8$H$_{13}$N$_5$O$_2$S: C 39.50; H 5.39; N 28.80
Found: C 40.10; H 5.68; N 28.07.

EXAMPLE 17

Preparation of 1-Ethyl-3-(4-ethoxycarbonyl-1,2,3-thiadiazol-5-yl)urea

By the method of Example 4, 10 g of phenyl (4-ethoxycarbonyl-1,2,3-thiadiazol-5-yl)carbamate was dissolved in 150 ml of chloroform, and to the solution was added during ½ hour a solution of 1.85 g of ethylamine in 100 ml of chloroform. After the mixture was stirred at room temperature for about 72 hours, thin-layer chromatographic analysis indicated that reaction was incomplete. Precipitated solid was removed by filtration, a few drops of ethylamine were added to the filtrate, and stirring was continued for 24 hours. Thin-layer chromatographic analysis again showed the reaction was incomplete. After removal of solid and addition of several drops of ethylamine to the filtrate, stirring was continued for an additional 24 hours, after which thin-layer chromatographic analysis showed the reaction to be complete. The reaction mixture was concentrated under vacuum to yield a solid which was washed with ether. The filtered solids and that recovered from the solvent were combined and recrystallized from ethanol to give a total of 4.65 g of 1-ethyl-3-(4-ethoxycarbonyl-1,2,3-thiadiazol-5-yl)urea; mp = 225.5°–226°. The ir, nmr and mass spectra of the product were consistent with the assigned structure.

Analysis: Calc'd for C$_8$H$_{12}$N$_4$O$_3$S: C 39.34; H 4.95; N 22.94
Found: C 39.49; H 4.93; N 22.80.

EXAMPLE 18

Preparation of 1,1-Dimethyl-3-]4-(methyl-(isopropyl)carbamoyl-1,2,3-thiadiazol-5-yl]urea To a solution of 13.4 g of potassium hydroxide in a mixture of 600 ml of ethanol and 200 ml of water was added 53 g of 1,1-dimethyl-3-(4-ethoxycarbonyl-1,2,3-thiadiazol-5-yl)urea (Example 1). This mixture was heated under reflux for 18 hours, then treated with activated charcoal and filtered. The solvent was removed by distillation under reduced pressure. The solid residue was dissolved in ice water. Addition of dilute hydrochloric acid gave a precipitate which was collected on a filter, washed with water, and dried to yield 41.3 g of 5-(3,3-dimethylureido(-1,2,3-thiadiazole-4-carboxylic acid; mp = 193°–197°. (Recrystallized from acetonitrile, the product melted at 205°.) After the acid, mixed with 450 ml of thionyl chloride, was heated under reflux for 45 minutes, the excess thionyl chloride was removed by distillation under reduced pressure. The resulting acid chloride was dissolved in sufficient methylene chloride to give a total volume of 300 ml of solution, which was used in the next step without further purification.

(In another preparation, 5-(3,3-dimethylureido)-1,2,3-thiadiazole-4-carbonyl chloride was isolated as a yellow-brown crystalline solid, mp = 120°–125°, which tended to decompose on standing.)

Fifty milliliters of the methylene chloride solution described above was added to a solution of 2.5 g of (methyl)-(isopropyl)amine in 50 ml of methylene chloride. The mixture was allowed to stand for 2 hours, washed successively with water and dilute hydrochloric acid, and then dried over sodium sulfate. After the solvent was removed under reduced pressure, the residue was washed with petroleum ether and recrystallized twice from cyclohexane to give 3.81 g of 1,1-dimethyl-3-[4-(methyl)(isopropyl)carbamoyl-1,2,3-thiadiazol-5-yl]urea; mp = 121°–123°.

Analysis: Calc'd for C$_{10}$H$_{17}$N$_5$O$_2$S: C 44.27; H 6.32; N 25.82
Found: C 44.13; H 6.10; N 25.96.

EXAMPLE 19

Preparation of the Sodium Salt of 1,1-Dimethyl-3-(4-isobutylcarbamoyl-1,2,3-thiadiazol-5-yl)urea A solution of 1.0 g of sodium methoxide in 30 ml of methanol was added to a solution of 5.0 g of 1,1-dimethyl-3-(4-isobutylcarbamoyl-1,2,3-thiadiazol-5-yl)urea (Example 6) in 200 ml of methanol. The solvent was removed under reduced pressure, the residue was triturated with an ether-petroleum ether mixture, and the washed solid was recrystallized from acetonitrile to give 4.2 g of the sodium salt of 1,1-dimethyl- 3-(4-isobutylcarbamoyl-1,2,3-thiadiazol-5-yl)urea; mp = 260° (decomposed). After two more recrystallizations, the melting point was 290°. The ir and nmr spectra were consistent with the assigned structure.

Analysis: Calc'd for C$_{10}$H$_{16}$N$_5$NaO$_2$S: C 40.95; H 5.50; N 23.88
Found: C 40.01; H 5.60; N 22.80.

EXAMPLE 20

Preparation of 1-Methyl-3-(4-isobutyl-carbamoyl-1,2,3-thiadiazol-5-yl)urea

A mixture of 5.0 g of 1-methyl-3-(4-ethoxycarbonyl-1,2,3-thiadiazol-5-yl)urea (Example 2) and 60 ml of isobutylamine was stirred about 16 hours at room temperature. The excess isobutylamine was removed by evaporation under reduced pressure to leave a yellow solid. The filtrate and the solid residue were worked up separately.

The solid was triturated with 100 ml of methylene chloride and the isoluble solid isolated by filtration. The filtrate was concentrated to give a solid residue which was washed first with dilute hydrochloric acid, then with water. Recrystallization from acetonitrile gave 1-methyl-3-(4-isobutylcarbamoyl-1,2,3-thiadiazol-5-yl(urea; mp = 172°–174°. The ir and nmr spectra were consistent with the assigned structure.

The methylene chloride-insoluble solid was determined by ir and nmr spectra to be the isobutylamine salt of the desired urea. Treatment of this solid with dilute hydrochloric acid gave a product (mp = 172°–174° after recrystallization from carbon tetrachloride) identical with that obtained from the filtrate as described above.

Analysis: Calc'd for C$_9$H$_{15}$N$_5$O$_2$S: C 42.02; H 5.88; N 27.23
Found: C 42.11; H 5.67; N 26.99.

The reaction was repeated, using 39 g of 1-methyl-3-(4-ethoxycarbonyl-1,2,3-thiadiazol-5-yl)urea and 300 ml of isobutylamine. The excess amine was removed and the residue was stirred for 10 minutes with 150 ml of 5 percent hydrochloric acid. The solid was collected on a filter and washed with water. The washed solid was stirred with 400 ml of chloroform and then filtered. The filtrate was processed as described above to give 29.55 g of white solid, mp = 170°–172°, the nmr spectrum of which varied slightly from that of the previously described product and indicated the solid to be a hydrate. The treatment with dilute hydrochloric acid was repeated without change in spectrum, but recrystallization of the solid from benzene gave 20.55 g of product identical with that described above.

The chloroform-insoluble solid from above was recrystallized from acetonitrile to give the isobutylamine salt of 1-methyl-3-(4-isobutylcarbamoyl-1,2,3-thiadiazol-5-yl)urea; mp = 171°–173°.

Analysis: Calc'd for $C_{13}H_{26}N_6O_2S$: C 47.26; H 7.93; N 25.44
Found: C 47.34; H 7.76; N 25.08.

EXAMPLE 21

Preparation of 1-Methyl-3-(4-isobutylcarbamoyl-1,2,3-thiadiazol-5-yl)-2-thiourea A mixture of 5.6 g of 1-methyl-3-(4-isobutylcarbamoyl-1,2,3-thiadiazol-5-yl)urea (Example 20), 4.8 g of phosphorus pentasulfide and a small amount of sodium hydrosulfide in 225 ml of dioxane was stirred under reflux for about 20 hours. The solution was treated with activated charcoal, filtered, and concentrated under reduced pressure to give an oil which yielded a solid on treatment with cyclohexane. Recrystallization 4 times from carbon tetrachloride gave 1.35 g of 1-methyl-3-(4-isobutylcarbamoyl-1,2,3-thiadiazol-5-yl)-2-thiourea; mp = 147°–149°. The ir, nmr and mass spectra were consistent with the assigned structure.

Analysis: Calc'd for $C_9H_{15}N_5OS_2$: C 39.56; H 5.53; N 25.63
Found: C 39.75; H 5.57; N 25.54.

EXAMPLE 22

Preparation of 1-Ethyl-3-(4-isobutylcarbamoyl-1,2,3-thiadiazol-5-yl)urea

A mixture of 5.0 g of 1-ethyl-3-(4-ethoxycarbonyl-1,2,3-thiadiazol-5-yl)urea (Example 17 ) in 100 ml of isobutylamine was stirred for about 20 hours at ambient temperature and then concentrated under reduced pressure. The residue was stirred for 30 minutes with 120 ml of water containing 6 ml of hydrochloric acid. The undissolved solid was isolated, washed with water, and then dissolved in chloroform. The chloroform solution was dried ($MgSO_4$) and concentrated. The residual solid was recrystallized twice from benzene to give 3.5 g of 1-ethyl-3-(4-isobutylcarbamoyl-1,2,3-thiadiazol-5-yl)urea; mp = 152°–153°. The ir spectrum was consistent with the assigned structure.

Analysis: Calc'd for $C_{10}H_{17}N_5O_2S$: C 44.27; H 6.32; N 25.82
Found: C 44.14; H 6.35; N 25.56.

EXAMPLE 23

Preparation of 1-Methyl-3-(4-methallylcarbamoyl-1,2,3-thiadiazol-5-yl)urea

By the method of Example 22, 5 g of 1-methyl-3-(4-ethoxycarbonyl-1,2,3-thiadiazol-5-yl)urea (Example 2) was reacted with 25 g of methallylamine to give 4.58 g of 1-methyl-3-(4-methallylcarbamoyl-1,2,3-thiadiazol-5-yl)urea, mp = 160°–162°when recrystallized from benzene. The ir spectrum was consistent with the assigned structure.

Analysis: Calc'd for $C_9H_{13}N_5O_2S$: C 42.35; H 5.13; N 27.44
Found: C 41.74; H 5.03; N 27.02.

EXAMPLE 24

Preparation of 1-Methyl-3-(4-isopropylcarbamoyl-1,2,3-thiadiazol-5-yl)urea (Example 16) was reacted with 5.8 g of phosphorus pentasulfide in 250 ml of dioxane. The reaction mixture was decanted from the insoluble material present (free sulfur) to give a solution which was treated with charcoal, filtered, and concentrated under reduced pressure. The residue was dissolved in ethanol, filtered, and again concentrated under reduced pressure. The residue was recrystallized from carbon tetrachloride to give 0.6 g of 1-methyl-3-(4-isopropylcarbamoyl-1,2,3-thiadiazol-5-yl)-2-thiourea, mp = 181°–183.5°. The ir and mass spectra were consistent with the assigned structure.

Analysis: Calc'd for $C_8H_{13}N_5OS_2$: C 37.07; H 5.06; N 27.02
Found: C 37.15; H 5.33; N 27.04.

EXAMPLE 25

Preparation of 1-Isopropyl-3-(4-isopropylcarbamoyl-1,2,3-thiadiazol-5-yl)urea

A mixture of 8 g of phenyl (4-ethoxycarbonyl-1,2,3-thiadiazol-5-yl)carbamate and 100 ml of isopropylamine was stirred at ambient temperature for 28 hours. The excess isopropylamine was evaporated under reduced pressure and the residual semisolid was washed with 200 ml of benzene. The insoluble solid was slurried with water and acidified with 5 percent hydrochloric acid. The solid was isolated on a filter and dissolved in chloroform. The chloroform solution was dried ($MgSO_4$) and solvent removed to yield 3.79 g of white solid, mp = 178°–181°. Recrystallization from benzene gave 2.67 g of 1-isopropyl-3-(4-isopropylcarbamoyl-1,2,3-thiadiazol-5-yl)urea, mp = 182°–185°. The ir and nmr spectra were consistent with the assigned structure.

Analysis: Calc'd for $C_{10}H_{17}N_5O_2S$: C 44.27; H 6.32; N 25.82
Found: C 44.17; H 6.26; N 25.90.

Additional compounds which have been prepared, and which have shown herbicidal activity, include the following 4-substituted compounds of 1,1-dimethyl-, 1-alkyl-, 1-alkenyl- and 1-alkoxy-3-(1,2,3-thiadiazol-5-yl)urea, listed with melting points in degrees centigrade:

| | |
|---|---|
| 1,1-Dimethyl-3-(4-methoxycarbonyl-1,2,3-thiadiazol-5-yl)urea | 143–145° |
| 1,1-Dimethyl-3-[4-(2-methylbutoxy)carbonyl-1,2,3-thiadiazol-5-yl]urea | 93.8–94.5° |
| 1,1-Dimethyl-3-(4-pentyloxycarbonyl-1,2,3-thiadiazol-5-yl)urea | 89.5–91.0° |
| 1,1-Dimethyl-3-(4-dodecyloxycarbonyl-1,2,3-thiadiazol-5-yl)urea | 81.5–82.3° |
| 1,1-Dimethyl-3-(4-cyclohexyloxycarbonyl-1,2,3-thiadiazol-5-yl)urea | 188–189° |
| 1,1-Dimethyl-3-(4-allyloxycarbonyl-1,2,3-thiadiazol-5-yl)urea | 154.5–155.3° |
| 1,1-Dimethyl-3-(4-propargyloxycarbonyl-1,2,3-thiadiazol-5-yl)urea | 217–218° |
| 1,1-Dimethyl-3-(4-ethylcarbamoyl-1,2,3-thiadiazol-5-yl)urea | 157.5–159° |
| 1,1-Dimethyl-3-(4-diethylcarbamoyl-1,2,3-thiadiazol-5-yl)urea | 138–139° |
| 1,1-Dimethyl-3-(4-propylcarbamoyl-1,2,3-thiadiazol-5-yl)urea | 143–145° |
| 1,1-Dimethyl-3-(4-pyrrolidinocarbonyl-1,2,3-thiadiazol-5-yl)urea | 151.5–153.0° |
| 1,1-Dimethyl-3-[4-(2-ethoxyethylcarbamoyl)-1,2,3-thiadiazol-5-yl]urea | 110–111.5° |
| 1,1-Dimethyl-3-[4-(1-(hydroxymethyl)propylcarbamoyl)-1,2,3-thiadiazol-5-yl]urea | 130–131° |
| 1,1-Dimethyl-3-(4-piperidinocarbonyl-1,2,3,-thiadiazol-5-yl)urea | 104–105° |
| 1,1-Dimethyl-3-(4-propynylcarbamoyl-1,2,3-thiadiazol-5-yl)urea | 231–233° |
| 1,1-Dimethyl-3-(4-tert-butylcarbamoyl-1,2,3-thiadiazol-5-yl)urea | 159–160° |
| 1,1-Dimethyl-3-(4-pentylcarbamoyl-1,2,3-thiadiazol-5-yl)urea | 108–110° |
| 1,1-Dimethyl-3-[4-(3-methylbutylcarbamoyl)-1,2,3-thiadiazol-5-yl]urea | 118.5–120.5° |
| 1,1-Dimethyl-3-[4-(2-methylbutylcarbamoyl)-1,2,3-thiadiazol-5-yl]urea | 108.5–110° |
| 1,1-Dimethyl-3-(4-cyclopentylcarbamoyl-1,2,3-thiadiazol-5-yl)urea | 156–158° |
| 1,1-Dimethyl-3-[4-(2-methoxyethylcarbamoyl)-1,2,3-thiadiazol-5-yl]urea | 163–164° |
| 1,1-Dimethyl-3-[4-(methyl)(propyl)carbamoyl-1,2,3-thiadiazol-5-yl]urea | 101–102° |
| 1,1-Dimethyl-3-[4-(methyl)(butyl)carbamoyl-1,2,3-thiadiazol-5-yl]urea | 54–58° |
| 1,1-Dimethyl-3-[4-(methyl)(2-butyl)carbamoyl-1,2,3-thiadiazol-5-yl]urea | 106–107° |
| 1,1-Dimethyl-3-[4-(methyl)(isobutyl)carbamoyl-1,2,3-thiadiazol-5-yl]urea | 51–55° |
| 1,1-Dimethyl-3-(4-isobutylcarbamoyl-1,2,3-thiadiazol-5-yl)thiourea 141° | |
| 1-Methyl-3-(4-sec-butylcarbamoyl-1,2,3-thiadiazol-5-yl)urea (appears to form hydrate, mp = 92–94°) | 139–141° |
| 1-Methyl-3-(4-butylcarbamoyl-1,2,3-thiadiazol-5-yl)urea | 162–163.5° |
| 1-Methyl-3-(4-methylcarbamoyl-1,2,3-thiadiazol-5-yl)urea | 255–256° |
| 1-Methyl-3-(4-isobutoxycarbonyl-1,2,3-thiadiazol-5-yl)urea | 228–230° |
| 1-Isobutyl-3-(4-ethoxycarbonyl-1,2,3-thiadiazol-5-yl)urea | 187–189° |
| 1-tert-Butyl-3-(4-ethoxycarbonyl-1,2,3-thiadiazol-5-yl)urea | 216–218° |
| 1-tert-Butyl-3-(4-isobutylcarbamoyl-1,2,3-thiadiazol-5-yl)urea | 127–130° |
| 1-Allyl-3-(4-isopropylcarbamoyl-1,2,3-thiadiazol-5-yl)urea | 112–114° |
| 1-Allyl-3-(4-ethoxycarbonyl-1,2,3-thiadiazol-5-yl)urea | 195–197° |
| 1-Methoxy-3-(4-isobutylcarbamoyl-1,2,3-thiadiazol-5-yl)urea | 189–191° (decomposes) |
| 1-Methoxy-3-(4-ethoxycarbonyl-1,2,3-thiadiazol-5-yl)urea | 152–154° |

For herbicidal applications, the active ingredients of this invention may be utilized in diverse formulations, including the adjuvants and carriers normally employed to facilitate the dispersion of active ingredients in agricultural applications, recognizing the fact that the formulation and mode of application of a toxicant may affect the activity of the material in a given application. Thus, a thiadiazolylurea of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as prilled fertilizer, or insoluble such as sand, marble chips or coarse talc. Particularly useful is a granule wherein a wettable powder is applied as a surface coating to a sand or other insoluble particle such that the wettable powder may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5 percent or as much as 95 percent of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5 to 80 percent of active ingredient, depending on the absorbency of the carrier, and usually also contain a small amount of a wetting, dispersing or emulsifying agent to facilitate dispersion. For example, a useful wettable powder formulation contains 80.8 parts of a thiadiazolylurea of this invention, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of a thiadiazolylurea of this invention with a liquid or solid emulsifying agent, or may also contain a liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 to 15 percent by weight of the herbicidal composition.

Other useful formulations for herbicidal applications include simple solutions of the active ingredient in a dispersant in which it is completely soluble at the desired concentration, such as acetone or other organic solvents. These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The selective herbicidal activity of the compounds of this invention is especially notable in post-emergence applications, as illustrated in the following examples:

EXAMPLE 26

Selective Herbicidal Activity

The post-emergence herbicidal activity of 1-alkyl- and 1,1-dimethyl-3-(1,2,3-thiadiazol-5-yl)urea, and of 1-methyl-3-(1,2,3-thiadiazol-5-yl)-2-thiourea with various substituents in the 4-position on the thiadiazol ring was demonstrated as follows: Test crop seeds of Lima beans (*Phaseolus lunatus*), corn (*Zea mays*), lettuce (*Lactuca sativa*), mustard (*Brassica juncea*), and crabgrass (*Digitaria sanguinalis*) were planted in 8×6×3 inch shallow flat-bed trays containing 2 to 3 inches of a loam soil. The growth trays were maintained in a greenhouse and regularly watered for approximately 2 weeks. When the first trifoliate leaves of bean plants were unfolding, the test plants were removed from the greenhouse and sprayed with an aqueous-acetone (1:1) solution of the candidate herbicide containing 1,500 ppm of active ingredient at a rate equivalent to 80 gallons per acre. This corresponds to one pound of active ingredient per acre. The plants were maintained in the greenhouse and regularly watered for an additional 2 weeks, after which time the phytotoxicity of the candidate herbicide was recorded in terms of percent kill. These results are shown in Table 1.

When the compound having only hydrogen at the 4-position was prepared, namely 1,1-dimethyl-3-(1,2,3-thiadiazol-5-yl)urea, mp = 228°C, it exhibited zero percent kill against any of the five test crops, following post-emergence application at a level of 8 pounds per acre.

Table 1

Selective Herbicidal Activity
Post-emergence Application

| Compound Tested at 1.0 lb/Acre | Percent Kill of Test Plant Species | | | | |
|---|---|---|---|---|---|
| | Lima Beans | Corn | Lettuce | Mustard | Crabgrass |
| 1-Methyl-3-(4-substituted-1,2,3-thiadiazol-5-yl)-urea ...where 4-substituent is: | | | | | |

Table 1—Continued

Selective Herbicidal Activity
Post-emergence Application

| Compound Tested at 1.0 lb/Acre | Percent Kill of Test Plant Species | | | | |
|---|---|---|---|---|---|
| | Lima Beans | Corn | Lettuce | Mustard | Crabgrass |
| ethoxycarbonyl- | 25 | 0 | 100 | 100 | 0 |
| methallylcarbamoyl- | 100 | 0 | 100 | 100 | 100 |
| isopropylcarbamoyl- | 90 | 0 | 100 | 100 | 20 |
| isobutylcarbamoyl- | 100 | 100 | 100 | 100 | 100 |
| (butylamine salt) | 100 | 30 | 100 | 100 | 95 |
| 1-Methyl-3-(4-substituted-1,2,3-thiadiazol-5-yl)-2-thiourea | | | | | |
| ...where 4-substituent is: | | | | | |
| isopropylcarbamoyl- | 30 | 0 | 100 | 100 | 100 |
| isobutylcarbamoyl- | 100 | 0 | 100 | 100 | 95 |
| 1-Ethyl-3-(4-substituted-1,2,3-thiadiazol-5-yl)-urea | | | | | |
| ...where 4-substituent is: | | | | | |
| ethoxycarbonyl- | 30 | 0 | 90 | 90 | 0 |
| isobutylcarbamoyl- | 100 | 30 | 100 | 100 | 100 |
| 1-Isopropyl-3-(4-isopropylcarbamoyl-1,2,3-thiadiazol-5-yl)-urea | 100 | 30 | 100 | 100 | 100 |
| 1,1-Dimethyl-3-(4-substituted-1,2,3-thiadiazol-5-yl)-urea | | | | | |
| ...where 4-substituent is: | | | | | |
| ethoxycarbonyl- | 0 | 0 | 100 | 100 | 90 |
| propoxycarbonyl- | 30 | 0 | 90 | 90 | 30 |
| butoxycarbonyl- | 100 | 0 | 100 | 100 | 50 |
| isobutoxycarbonyl- | 70 | 70 | 100 | 100 | 100 |
| isobutylcarbamoyl- | 100 | 100 | 100 | 100 | 100 |
| (sodium salt) | 100 | 0 | 100 | 100 | 0 |
| decylcarbamoyl- | 70 | 0 | 70 | 90 | 10 |
| isopropylcarbamoyl- | 100 | 70 | 100 | 100 | 100 |
| butylcarbamoyl- | 100 | 0 | 100 | 100 | 90 |
| sec-butylcarbamoyl- | 100 | 0 | 100 | 100 | 100 |
| allylcarbamoyl- | 100 | 0 | 100 | 100 | 100 |
| methallylcarbamoyl- | 100 | 0 | 100 | 100 | 95 |
| dimethylcarbamoyl-* | 100 | 0 | 100 | 100 | 70 |
| (methyl)(isopropyl)-carbamoyl- | 100 | 0 | 100 | 100 | 0 |
| morpholinocarbonyl- | 70 | 0 | 100 | 100 | 50 |
| carbazoyl- | 0 | 0 | 100 | 100 | 80 |

*Compound tested at 8 pounds per acre

EXAMPLE 27

Selective Herbicidal Activity of 1,1-Dimethyl-3-(4-isobutylcarbamoyl-1,2,3-thiadiazol-5-yl)urea The outstanding selectivity of 1,1-dimethyl-3-(4-isobutylcarbamoyl-1,2,3-thiadiazol-5-yl)urea was demonstrated as follows: Seeds of test plants were planted in 8×6×3 inch shallow flat-bed trays containing 2 to 3 inches of a loam coil. The growth trays were maintained in a greenhouse and regularly watered. Sixteen days after planting, a set of plants were sprayed with an aqueous-acetone (1:1) solution of 1,1-dimethyl-3-(4-isobutylcarbamoyl-1,2,3-thiadiazol-5-yl)urea at a rate corresponding to 80 gallons per acre (the 4 pounds per acre solution contained 6,000 ppm of active ingredient). The plants were maintained in the greenhouse and regularly watered for an additional 3 weeks, after which time the phytotoxicity of the compound was recorded in terms of percent kill. These results are shown in Table 2. Peanuts were uninjured even at 4 pounds, a rate at which all these important weeds were killed.

Table 2

Selective Herbicidal Activity
of 1,1-Dimethyl-3-(4-isobutylcarbamoyl-
1,2,3-thiadiazol-5-yl)urea
Post-emergence Application

| Test Plant Species | Percent Kill | | | |
|---|---|---|---|---|
| | 0.5 lb/Acre | 1.0 lb/Acre | 2.0 lb/Acre | 4.0 lb/Acre |
| Peanut (*Arachis hypogaea*) | 0 | 0 | 0 | 0 |
| Green foxtail grass (*Setaria viridis*) | 100 | 100 | 100 | 100 |
| Barnyard grass (*Echinochloa crusgalli*) | 0 | 20 | 80 | 100 |
| Velvet leaf (*Abutilon theophrasti*) | 100 | 100 | 100 | 100 |
| Crabgrass (*Digitaria sanguinalis*) | 0 | 90 | 95* | 95* |
| Annual morning-glory (*Ipomoea purpurea*) | 0 | 30 | 100 | 100 |
| Johnson grass (*Sorghum halepense*) | 70 | 80 | 95* | 100 |

*Survivors were badly injured and will die

EXAMPLE 28

Selective Herbicidal Activity of 1,1-Dimethyl-3-(4-butyl- and 1,1-Dimethyl-3-(4-sec-butyl- carbamoyl-1,2,3-thiadiazol-5-yl)ureas In the manner as described in Example 27, test plants were grown and treated with the test compounds. The results are shown in Table 3. The corn was not injured even at 4 pounds by the n-butyl compound or at 2 pounds by the sec-butyl compound, while the green foxtail grass and velvet leaf, both very important weed pests in corn, were eliminated even at ½ pound.

EXAMPLE 29

Selective Herbicidal Activity of 1-Methyl-3-(4-isopropylcarbamoyl-1,2,3-thiadiazol-5-yl)urea The outstanding pre-emergence herbicidal activity of 1-methyl-3-(4-isopropylcarbamoyl-1,2,3-thiadiazol-5-yl)urea was demonstrated as follows: Seeds of test plants were planted in 8×6×3 inch shallow flat-bed trays containing 2 to 3 inches of a loam soil. The growth trays were immediately sprayed with an aqueous-acetone (1:1) solution of 1-methyl-3-(4-isopropylcarbamoyl-1,2,3-thiadiazol-5-yl)urea at a rate corresponding to 80 gallons per acre (the 4 pounds per acre (the 4 pounds per acre solution containing 6,000

Table 3

Selective Herbicidal Activity
of 1,1-Dimethyl-3-(4-butylcarbamoyl-
1,2,3-thiadiazol-5-yl)urea and 1,1-Dimethyl-3-(4-sec-butylcarbamoyl-
1,2,3-thiadiazol-5-yl)urea Post-emergence Application

| Test Plant Species | Compound | Percent Kill | | | |
|---|---|---|---|---|---|
| | | 0.5 lb/Acre | 1.0 lb/Acre | 2.0 lb/Acre | 4.0 lb/Acre |
| Corn | n-Butyl | 0 | 0 | 0 | 0 |
| | s-Butyl | 0 | 0 | 0 | 30 |
| Green foxtail grass | n-Butyl | 90* | 100 | 100 | 100 |
| | s-Butyl | 100 | 100 | 100 | 100 |
| Barnyard grass | n-Butyl | 0 | 0 | 10 | 50 |
| | s-Butyl | 0 | 0 | 30 | 10 |
| Velvet leaf | n-Butyl | 100 | 100 | 100 | 100 |
| | s-Butyl | 100 | 100 | 100 | 100 |
| Crabgrass | n-Butyl | 0 | 0 | 0 | 70 |
| | s-Butyl | 0 | 0 | 30 | 40 |
| Annual morning-glory | n-Butyl | 30 | 80 | 80 | 90* |
| | s-Butyl | 30 | 100 | 100 | 90* |

*Survivors very badly injured and will die

While the herbicidal activity of the substituted thiadiazolylureas of this invention is particularly outstanding when treatment is post-emergence, they are also effective against many weeds when applied as pre-emergence treatment. For example, 1-methyl-3-(4-isopropylcarbamoyl-1,2,3-thiadiazol-5-yl)urea was a highly active herbicide, as shown in Example 29.

ppm of active ingredient). The treated trays were maintained in the greenhouse and regularly watered for 19 days, after which time the phytotoxicity of the compound was recorded in terms of percent kill.

The post-emergence activity of 1-methyl-3-(4-isopropylcarbamoyl-1,2,3-thiadiazol-5yl)urea was demonstrated in the manner described in Example 26.

Results of the pre- and post-emergence tests are shown in Table 4.

Table 4

Selective Herbicidal Activity
of 1-Methyl-3-(4-isopropylcarbamoyl-
1,2,3-thiadiazol-5-yl)urea

| Test Plant Species | Percent Kill | | | |
|---|---|---|---|---|
| | 0.5 lb/Acre | 1.0 lb/Acre | 2.0 lb/Acre | 4.0 lb/Acre |
| Pre-emergence | | | | |
| Lima beans | 30 | 100 | 100 | 100 |
| Corn | 30 | 30 | 100 | 100 |
| Lettuce | 80 | 100 | 100 | 100 |
| Mustard | 100 | 100 | 100 | 100 |
| Crabgrass | 20 | 100 | 100 | 100 |
| Post-emergence | | | | |
| Lima beans | 100 | 90 | 100 | 100 |
| Corn | 0 | 0 | 100 | 100 |
| Lettuce | 100 | 100 | 100 | 100 |
| Mustard | 100 | 100 | 100 | 100 |
| Crabgrass | 10 | 20 | 100 | 100 |

The active compounds of this invention may be formulated and/or applied with insecticides, fungicides, nematocides, plant growth regulators, fertilizers, and other agricultural chemicals. In applying the active compounds of this invention, whether formulated alone or with other agricultural chemicals, an effective amount of the thiadiazolylurea of this invention is of course employed.

We claim:

1. A herbicidal composition comprising
   a. as active ingredient, a herbicidally effective amount of a compound of the formula:

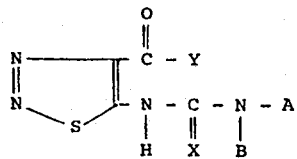

where A is lower alkyl or alkenyl radical of up to four carbon atoms; B is —H or —CH$_3$, with the proviso that B is —H when A is other than —CH$_3$; X is oxygen or sulfur; Y is —OR, —NHR, —NRR', —NH—NH$_2$ or

in which R and R' are alkyl, alkenyl, alkynyl, cycloalkyl, hydroxyalkyl, or alkoxyalkyl groups containing up to 12 carbon atoms, and in which R and R' may be the same or different; Z is —O—, —CH$_2$— or absent; and the agriculturally acceptable metallic and amine salts thereof;
   b. an inert agricultural carrier; and
   C. a surface-active agent.

2. A composition according to claim 1 in which the active compound is 1,1-dimethyl-3-(4-butylcarbamoyl-1,2,3-thiadiazol-5-yl)urea, 1,1-dimethyl-3-(4-sec-butylcarbamoyl-1,2,3-thiadiazol-5-yl)urea, 1,1-dimethyl-3-(4-isobutylcarbamoyl-1,2,3-thiadiazol-5-yl)urea, 1,1-dimethyl-3-[4-(methyl)(isopropyl)carbamoyl-1,2,3-thiadiazol-5-yl]urea, 1-methyl-3-(4-isopropylcarbamoyl-1,2,3-thiadiazol-5-yl)urea, 1-methyl-3-(4-isobutylcarbamoyl-1,2,3-thiadiazol-5-yl)urea, 1-methyl-3-(4-methallylcarbamoyl-1,2,3-thiadiazol-5-yl)urea, 1-ethyl-3-(4-isobutylcarbamoyl-1,2,3-thiadiazol-5-yl)urea, or 1-isopropyl-3-(4-isopropylcarbamoyl-1,2,3-thiadiazol-5-yl)urea.

3. A method of controlling undesired plant growth which comprises applying to the locus where control is desired a herbicidally effective amount of a compound of the formula:

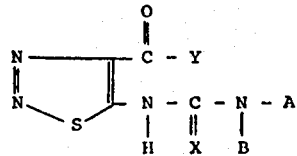

where A is lower alkyl or alkenyl radical of up to four carbon atoms; B is —H or —CH$_3$, with the proviso that B is —H when A is other than —CH$_3$; X is oxygen or sulfur; Y is —OR, —NHR, —NRR', —NH—NH$_2$ or

in which R and R' are alkyl, alkenyl, alkynyl, cycloalkyl, hydroxyalkyl, or alkoxyalkyl groups containing up to 12 carbon atoms, and in which R and R' may be the same or different; Z is —O—, —CH$_2$—or absent; and the agriculturally acceptable metallic and amine salts thereof.

4. A method according to claim 3 in which the compound is 1,1-dimethyl-3-(4-butylcarbamoyl-1,2,3-thiadiazol-5-yl)urea, 1,1-dimethyl-3-(4-sec-butylcarbamoyl-1,2,3-thiadiazol-5-yl)urea, 1,1-dimethyl-3-(4-isobutylcarbamoyl-1,2,3thiadiazol-5-yl)urea, 1,1-dimethyl-3-[4-(methyl)(isopropyl)carbamoyl-1,2,3-thiadiazol-5-yl]urea, 1-methyl-3-(4-isopropylcarbamoyl-1,2,3-thiadiazol-5-yl)-urea, 1-methyl-3-(4-isobutylcarbamoyl-1,2,3-thiadiazol-5-yl)urea, 1-methyl-3-(4-methallylcarbamoyl-1,2,3-thiadiazol-5-yl)urea, 1-ethyl-31(4-isobutylcarbamoyl-1,2,3-thiadiazol-5-yl)urea or 1-isopropyl-3-(4-isopropylcarbamoyl-1,2,3-thiadiazol-5-yl)urea.

* * * * *

UNITED STATES PATENT OFFICE
CERTIFICATE OF CORRECTION

PATENT NO. : 3,874,873
DATED : April 1, 1975
INVENTOR(S) : G.P.Volpp and H.Dounchis It is certified that error appears in the above-identified patent and that said Letters Patent are hereby corrected as shown below:

Column 2, line 4, change "-NB-NH$_2$" to --- -NH-NH$_2$---.

Column 4, line 29, change "44.3" to ---4.43---.

Column 6, line 27, change "111°" to ---117°---.

Column 7, line 34, change "13°" to ---134°---.

Column 12, line 21, after "urea", start paragraph as follows:
   ---By the method of Example 21, 6.4 g of 1-methyl-3-(4-isopropylcarbamoyl-1,2,3-thiadiazol-5-yl)urea---.

Column 22, line 52 (claim 4), after "1-ethyl-3", substitute hyphen for "1".

Signed and Sealed this twenty-first Day of October 1975

[SEAL]

Attest:

RUTH C. MASON
Attesting Officer

C. MARSHALL DANN
Commissioner of Patents and Trademarks